US010339366B2

(12) United States Patent
Mechaley, Jr.

(10) Patent No.: US 10,339,366 B2
(45) Date of Patent: Jul. 2, 2019

(54) SYSTEM AND METHOD FOR FACIAL RECOGNITION

(71) Applicant: MobileSphere Holdings II LLC, Kirkland, WA (US)

(72) Inventor: Robert G. Mechaley, Jr., Kirkland, WA (US)

(73) Assignee: MobileSphere Holdings II LLC, Kirkland, WA (US)

( * ) Notice: Subject to any disclaimer, the term of this patent is extended or adjusted under 35 U.S.C. 154(b) by 913 days.

(21) Appl. No.: 14/061,406

(22) Filed: Oct. 23, 2013

(65) Prior Publication Data

US 2015/0109428 A1 Apr. 23, 2015

(51) Int. Cl.
*G06K 9/00* (2006.01)
*H04N 7/18* (2006.01)
*G06F 21/00* (2013.01)
*H04W 12/06* (2009.01)
*H04L 29/06* (2006.01)

(52) U.S. Cl.
CPC ......... *G06K 9/00288* (2013.01); *G06F 21/00* (2013.01); *G06K 9/00979* (2013.01); *H04W 12/06* (2013.01); *H04L 63/0853* (2013.01); *H04L 63/0861* (2013.01)

(58) Field of Classification Search
None
See application file for complete search history.

(56) References Cited

U.S. PATENT DOCUMENTS

| 6,094,483 A * | 7/2000 | Fridrich | G06T 1/0021 375/E7.026 |
| 8,370,926 B1* | 2/2013 | Satish | G06F 21/36 380/270 |
| 2004/0083391 A1* | 4/2004 | De Jong | G06F 21/10 726/27 |
| 2006/0126905 A1* | 6/2006 | Loo | G06K 9/00255 382/118 |
| 2007/0092112 A1* | 4/2007 | Awatsu | G06F 21/32 382/115 |
| 2008/0013832 A1* | 1/2008 | Lev | G06K 9/00624 382/181 |

(Continued)

*Primary Examiner* — Frederick D Bailey
(74) *Attorney, Agent, or Firm* — Davis Wright Tremaine LLP; Michael J. Donohue

(57) ABSTRACT

A user verification system employs forward and rearward facing imaging devices on a mobile communication device. An image is displayed on the display of a computing device from which a user wishes to access computer services. The user captures the displayed image with one of the imaging devices on the mobile communication device and simultaneously takes a picture of the user. An authentication system compares the displayed image captured by the mobile communication device with a stored image to determine a match. A successful match results in a displayed match indicator. In addition, the captured facial image of the user is compared with a stored image of an authenticated user. A successful match between the captured facial image and the stored image results in the generation of a facial match indicator. Computer access is granted to an authenticated user only if both the captured display image and the captured facial image result in a match with the stored counterpart images.

50 Claims, 5 Drawing Sheets

(56) References Cited

U.S. PATENT DOCUMENTS

| | | | |
|---|---|---|---|
| 2011/0030040 A1* | 2/2011 | Ronchi | G06F 21/126 726/5 |
| 2011/0162066 A1* | 6/2011 | Kim | G06F 3/017 726/18 |
| 2011/0188713 A1* | 8/2011 | Chin | G06F 16/583 382/118 |
| 2012/0074227 A1* | 3/2012 | Ferren | G02B 13/0065 235/462.21 |
| 2012/0120186 A1* | 5/2012 | Diaz | H04N 5/2258 348/36 |
| 2012/0160912 A1* | 6/2012 | Laracey | G06Q 20/1085 235/379 |
| 2012/0268241 A1* | 10/2012 | Hanna | G06F 21/32 340/5.52 |
| 2013/0027561 A1* | 1/2013 | Lee | G06Q 30/02 348/150 |
| 2013/0104213 A1* | 4/2013 | Nandakumar | G06F 21/31 726/7 |
| 2013/0167212 A1* | 6/2013 | Azar | G06F 21/32 726/7 |
| 2014/0115341 A1* | 4/2014 | Robertson | H04L 9/3228 713/183 |
| 2014/0143860 A1* | 5/2014 | Druckman | G06F 21/36 726/19 |
| 2015/0067786 A1* | 3/2015 | Fiske | H04L 63/08 726/4 |
| 2015/0082390 A1* | 3/2015 | Flink | H04L 63/0861 726/4 |

* cited by examiner

SYSTEM AND METHOD FOR FACIAL RECOGNITION

BACKGROUND OF THE INVENTION

Field of the Invention

The present disclosure is related generally to techniques for user identity verification on a computer, and more particularly, to a system and method for using captured images to verify user identity.

Description of the Related Art

The verification of user identity on a computer is sometimes a simple task. The computer coupled to a computer network typically has a media access control (MAC) address that does not change. If the user is operating from a private computer, such as a computer at home or at the office, there is some assurance of the identity of that user. However, it is sometimes desirable to provide independent verification of the user identity even in these circumstances.

In addition, computers in a public area, such as a library, hotel lobby, or the like, accommodate many users whose identities are unknown. The use of such a public computer often leads to the inadvertent disclosure of confidential information. Under these circumstances, it is desirable to verify the identity of the user before accepting data from the computer. For example, a user may access a bank account using a public computer. If data is inadvertently left on the public computer, an unscrupulous individual may be able to access the bank account.

Therefore, it can be appreciated that there is a significant need for a technique to verify user identity on a computer. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The present disclosure is directed to techniques for verifying the identity of the user on a computer. As discussed above, this is particularly important when the computer is a publically accessible computer, but is readily applicable to any computer. Even on a private computer, the techniques discussed herein could be used, for example, to replace the conventional user log-in operation. As will be described in detail below, one portion of the identity verification system stores a plurality of images, or can create images dynamically. The image is transmitted via a conventional computer network to the computer in question where the image is displayed on the computer display. One known identity verification system is disclosed in application Ser. No. 12/961,392, entitled system and method for identity verification on a computer, filed on Dec. 6, 2010, now U.S. Pat. No. 8,464,324 discloses verification techniques using captured display images. That disclosure is incorporated herein in its entirety.

The present disclosure provides an augmented identity verification system by capturing both displayed images and a facial image of the user. The user whose identity is to be verified captures the displayed image using a forward-facing camera, or other imaging device, common to many mobile communication devices (e.g., a cell phone, smart phone, PDA, or the like). At the same time, a rear-facing camera, or other imaging device, captures an image of the user. In one embodiment, the mobile communication device transmits the captured images via the mobile communication network to which it is coupled. The images are relayed back to the server where the captured images are compared with original images. If the images match to a specified degree, the user's identity has been verified.

Figure 1:
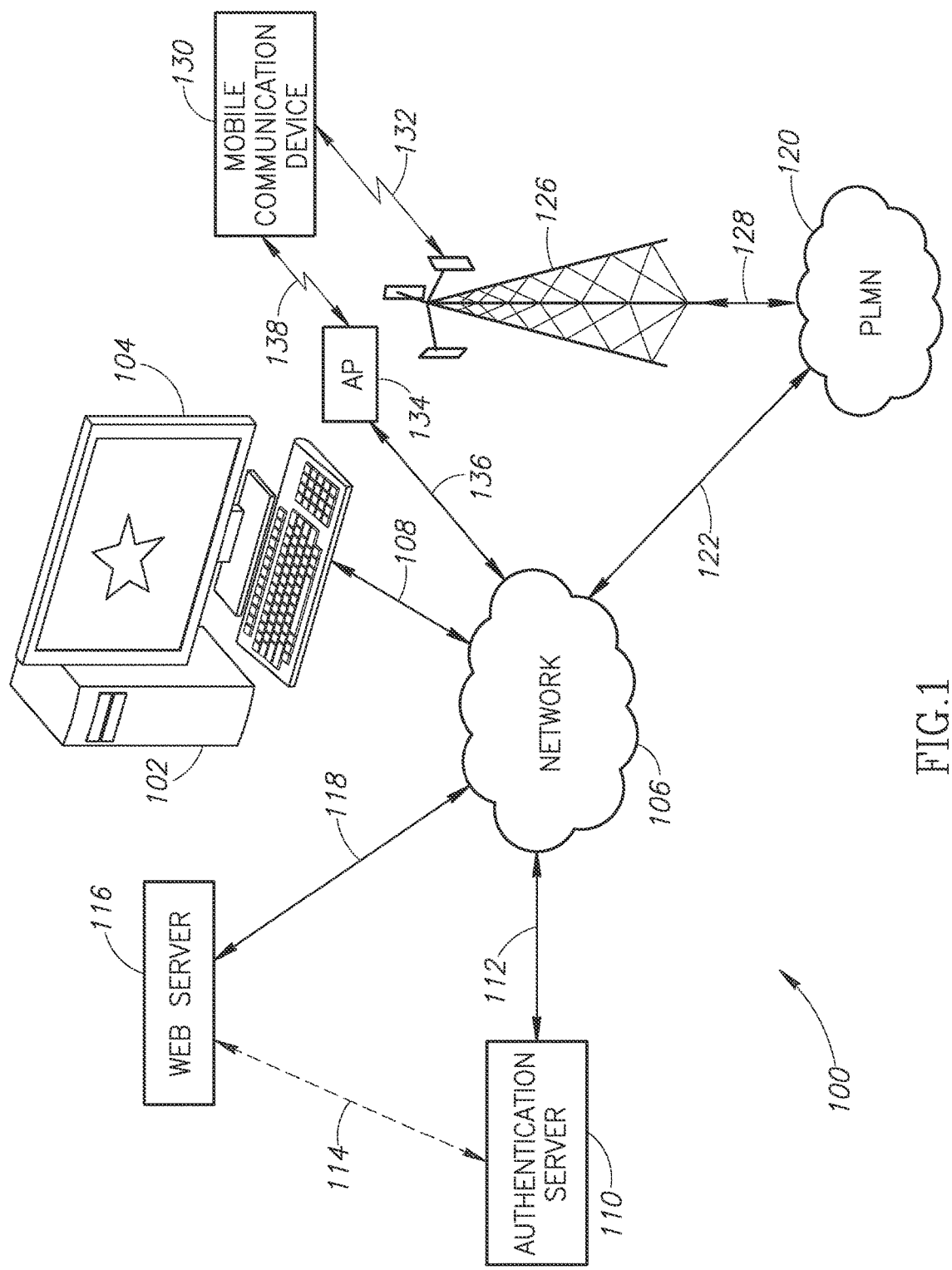
FIG. 1 illustrates an exemplary embodiment of a system architecture configured in accordance with the present disclosure.

The present disclosure is embodied, in one example, in a system 100 illustrated in FIG. 1. A computer 102 having a display 104 is coupled to a network 106, such as the Internet, via a communication link 108. The system 100 provides a technique to verify the identity of a user of the computer 102. As discussed above, the computer 102 may be a private computer (i.e., an individual's personal computer) or a public computer (e.g., in a library or hotel lobby). Furthermore, although the computer 102 is illustrated as a personal computer, those skilled in the art will appreciate that the principles of the system 100 are applicable to any computing device capable of rendering images, such as an automated teller machine (ATM), point-of-sales (POS) terminal, or the like. Thus, the system 100 is not limited to a particular form of computing device.

The system 100 includes an authentication server 110 coupled to the network 106 via a communication link 112. Operational details of the authentication server 110 are provided below.

A web server 116 is coupled to the network via a communication link 118. As will be described in greater detail below, the web server 116 may initiate the authentication process. For example, the web server 116 could host a website for on-line purchases. Alternatively, the web server 116 may host the website for a bank or other financial institution. In yet another alternative embodiment, the web server 116 may host a secure website, such as a business, law firm, or the like. In this embodiment, the web server 116 effectively acts as a gateway and may provide access to a secure local area network (LAN). If the computer 102 wishes to access the web server 116, the web server initiates the authentication process of the system 100. Although discussed herein as a "web server," for ease in understanding, the web server 116 can be implemented as any server capable of causing an image to be displayed on the display 104 of the computer 102.

In an exemplary embodiment, the authentication server 110 and web server 116 are both coupled to the network via the communication links 112 and 118, respectively. In this embodiment the system 100 is implemented as a distributed system, and the authentication server 110 can provide security services for a number of unrelated web servers 166. In an alternative embodiment, the authentication server 110 and the web server 116 may be coupled together by a link 114. The link 114 could represent a local area network (LAN) that handles communication between the authentication server 110 and the web server 116 instead of communication via the network 110. In this embodiment, a number of web servers 116 may be owned by a single entity and a LAN link 114 could provide greater security.

In yet another alternative embodiment, the authentication server 110 could be implemented as a portion of the web server 116 (or vice versa). In this embodiment, the link 114 could represent an internal bus connecting the different server portions. In this embodiment a single integrated authentication server 110/web server 116 could provide identity authentication for a number of computers 102. For example, a number of computers 102 could represent a plurality of point-of-sales (POS) terminals in a large retail facility. The retail facility could have a single integrated authentication server 110/web server 116 to provide authentication services for the entire retail facility.

The alternative system architectures described above are intended merely to illustrate different forms of implementation and communication pathways. The system 100 is not limited to any particular architecture or implementation described in the examples (e.g., distributed network, LAN or integrated operation).

In one embodiment, the system 100 utilizes a mobile communication network, such as a public land mobile network (PLMN) 120 coupled to the network 106 via a communication link 122. A base station 126 is coupled to the PLMN 120 via a backhaul communication link 128. Those skilled in the art will appreciate that a typical wireless communication network, such as the PLMN 120, include a large number of base stations. However, for the sake of clarity, FIG. 1 illustrates only the base station 126.

A mobile communication device 130 is coupled to and in communication with the base station 126 via a wireless link 132. The mobile communication network, including the PLMN 120, base station 126, and mobile communication device 130 are illustrated in FIG. 1 as a generic wireless communication system. Those skilled in the art will appreciate that the elements of FIG. 1 that make up the wireless network may be implemented in accordance with any known wireless communication system. For example, the PLMN 120, base station 126 and mobile communication device 130 may be implemented in accordance with any known communication protocol, such as GSM, CDMA, WiFi, WiMAX, 3G, 4G, LTE, or the like. Operational details of these various communication protocols are known in the art and need not be described in greater detail herein.

FIG. 1 also illustrates a wireless access point (AP) 134 coupled to the network 106 via communication link 136. The AP 134 is a conventional device that may operate in accordance with the IEEE 802.11 standards. In this embodiment, the mobile communication device 130 also includes a WiFi transceiver and establishes a wireless communication link 138 with the AP 134. In this embodiment, the captured image data is provided to the authentication server 110 via the AP 134.

Those skilled in the art will appreciate that the communication links 108, 112, 118, 122, and 136 may be implemented in many different forms, including hard wired, fiberoptic, microwave, wireless, or the like. For example, the communication link 108 connecting the computer 102 to the network 106 may be implemented using a dial-up modem, cable modem, satellite connection, wireless network, or the like. The system 100 may be satisfactorily implemented by one or more of these technologies, alone or in combination, for the communication links 108, 112, 118, 122, and 136. The system 100 is not limited by the specific form of these communication links.

As will be described in greater detail below, the authentication server 110 transmits an image to the computer 102 via the network 106. The image is shown on the display 104. The mobile communication device 130 is provided with both forward and rear-facing imaging devices, such as cameras. To verify identity, the user snaps a picture of the image on the display 104 using, for example, the forward-facing camera in the mobile communication device 130. At the same time, the other camera, for example the rearward-facing camera, captures the image of the face of the user. Thus, the mobile communication device 130 simultaneously captures the displayed imaged and the facial image of the user. In an exemplary embodiment, the images captured by the mobile communication device 130 is transmitted to the PLMN 120 or the AP 134 and relayed back to the authentication server 110. Image comparison technology within the authentication server 110 compares the captured display image from the display 104 to the original image transmitted from the authentication server. The authentication server 110 also compares the captured facial image with a stored facial image of the verified user. In one embodiment, certain extracted facial characteristics of the stored facial image may be compared with the captured facial image provided by the mobile communication device 130. If the captured images both match the respective stored images to a sufficient degree, the user identity is verified by virtue of the user identification associated with the mobile communication device 130.

Figure 2:
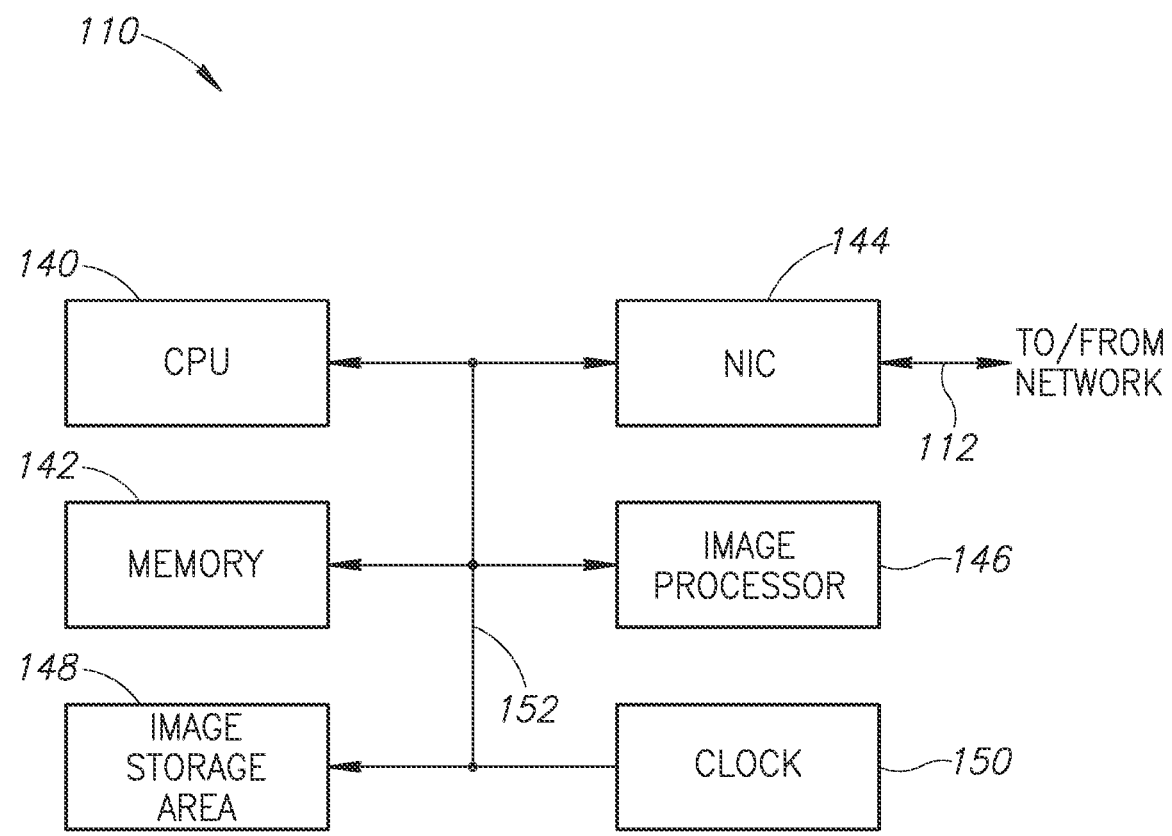
FIG. 2 is a functional block diagram of a server of FIG. 1.

FIG. 2 is a functional block diagram of the authentication server 110. The authentication server 110 includes a central processing unit (CPU) 140 and a memory 142. In general, the memory 142 contains data and instructions that are executed by the CPU 140. The CPU 140 may be implemented as a conventional microprocessor, microcontroller, digital signal processor, application specific integrated circuit, or the like. The authentication server 110 is not limited by the specific implementation of the CPU 140. Similarly, the memory 142 may be implemented with a variety of known technologies. The memory 142 may include random access memory, read-only memory, programmable memory, and the like. In one embodiment, a portion of the memory 142 may be integrated into the CPU 140. The authentication server 110 is not limited by the specific form of the memory 142.

FIG. 2 also illustrates a network interface controller (NIC) 144. The NIC 144 generically represents the interface between the authentication server 110 and the network 106. The specific implementation of the NIC 144 depends on the particular interface type and is within the scope of knowledge of one of ordinary skill in the art. For example, the NIC 144 may be an Ethernet interface coupled to a network access point (not shown). Alternatively, the NIC 144 may be a wireless interface or other known form of interface depending on the nature of the communication link 112 between the authentication server 110 and the network 106. The authentication server 110 is not limited by the specific implementation of the NIC 144.

The authentication controller 110 also includes an image processor 146 and an image storage area 148. As will be described in greater detail below, the image processor 146 may be used in one embodiment to generate images for transmission to the computer 102 (see FIG. 1). If the image processor 146 generates the image for transmission to the computer 102, a copy of the image is temporarily stored in the image storage area 148 for later comparison with a captured display image. As described above, the user captures the display image on the display 104 and the user image and transmits the captured image to the authentication server 110. The image processor 146 then compares the captured display image with the generated image to determine if they match. In one embodiment, the image processor 146 analyzes the captured display image with respect to the stored image without any analysis of embedded information in the images. For example, the captured display image can be easily scaled to have the same effective resolution as the stored image. The images can be aligned and overlaid on top of each other to determine whether the various elements in the images match each other. The image processor 146 also compares the facial image with the stored facial image or facial characteristics to determine if they match. The user is verified only if both captured images match the respective stored images.

Alternatively, the system 100 may use a plurality of images either previously generated by the image processor 146 or obtained from an external source. The images may be conventional images, such as photographs, drawings, or the like. The images may be realistic (e.g., the Lincoln Memorial) or abstract designs. The plurality of images, of any nature, are stored in the image storage area 148. While FIG. 2 illustrates the image storage area 148 as part of the authentication server 110, the image storage area could be in a separate location and coupled to the authentication server via a network connection in a local area network or a wide area network, such as the Internet. In operation, the image processor 146 may randomly select one of the stored images in the image storage area 148 for transmission to the computer 102.

FIG. 2 also illustrates a clock 150. As will be described in greater detail below, the image processor 146 can use the clock 150 to generate a time of day or date stamp when generating an image or when selecting an image from the image storage area 148. The date stamp can be used to make sure that the image is current. That is, the image is only valid for a predetermined period of time. In this embodiment, the image must be sent to the display 104 (see FIG. 1), captured by the mobile device, and returned to the authentication server within the predetermined period of time. Old images may be deleted by the image processor 146 on the basis of the date stamp.

The various components of FIG. 2 are coupled together by a bus system 152. The bus system 152 may comprise an address bus, data bus, control bus, power bus, and the like. For the sake of clarity, those various buses are illustrated in FIG. 2 as the bus system 152.

Those skilled in the art will appreciate that some of the functional blocks in FIG. 2 may be implemented as a set of instructions stored in the memory 142 and executed by the CPU 140. For example, the image processor 146 can be implemented as a separate device (e.g., a digital signal processor) or implemented as a set of instructions stored in the memory 142. Because the image processor 146 performs a separate function, it is illustrated as a separate block in the functional block diagram of FIG. 2.

Similarly, the image storage area 148 may be implemented as a separate storage component or integrated into the memory 142. The image storage area 148 may be implemented as any suitable data structure. In one embodiment, the image storage area 148 may be implemented as a database that may be an integral part of the authentication server 110 or implemented as a separate component coupled to the authentication server. For example, the image storage area 148 may be coupled to the authentication server via a local area network (LAN). In a distributed computer network, the image storage area 148 may be coupled to the network 106 and in communication with the authentication server 110 via the network.

The mobile communication device 130 performs a number of functions. First, it takes a picture of an image displayed on the display 104 of the computer 102. Secondly, it provides a file name for the captured image. In an exemplary embodiment, the file name of the image may include the IMSI of the mobile communication device 130 and a time stamp indicating the time at which the image was captured. In addition, the mobile communication device 130 sends the captured image to a predefined address. The mobile communication device 130 executes a simple application program that allows the capture of an image and the automatic transfer of the captured image, via the PLMN 120 or the AP 134, to a URL associated with the authentication server 110. Finally, the mobile communication device 130 provides dialog with the user to assist in the image capture process. As noted above, this may include providing guidance on how to take the "best picture" to thereby increase the probability of determining a match.

Figure 3:
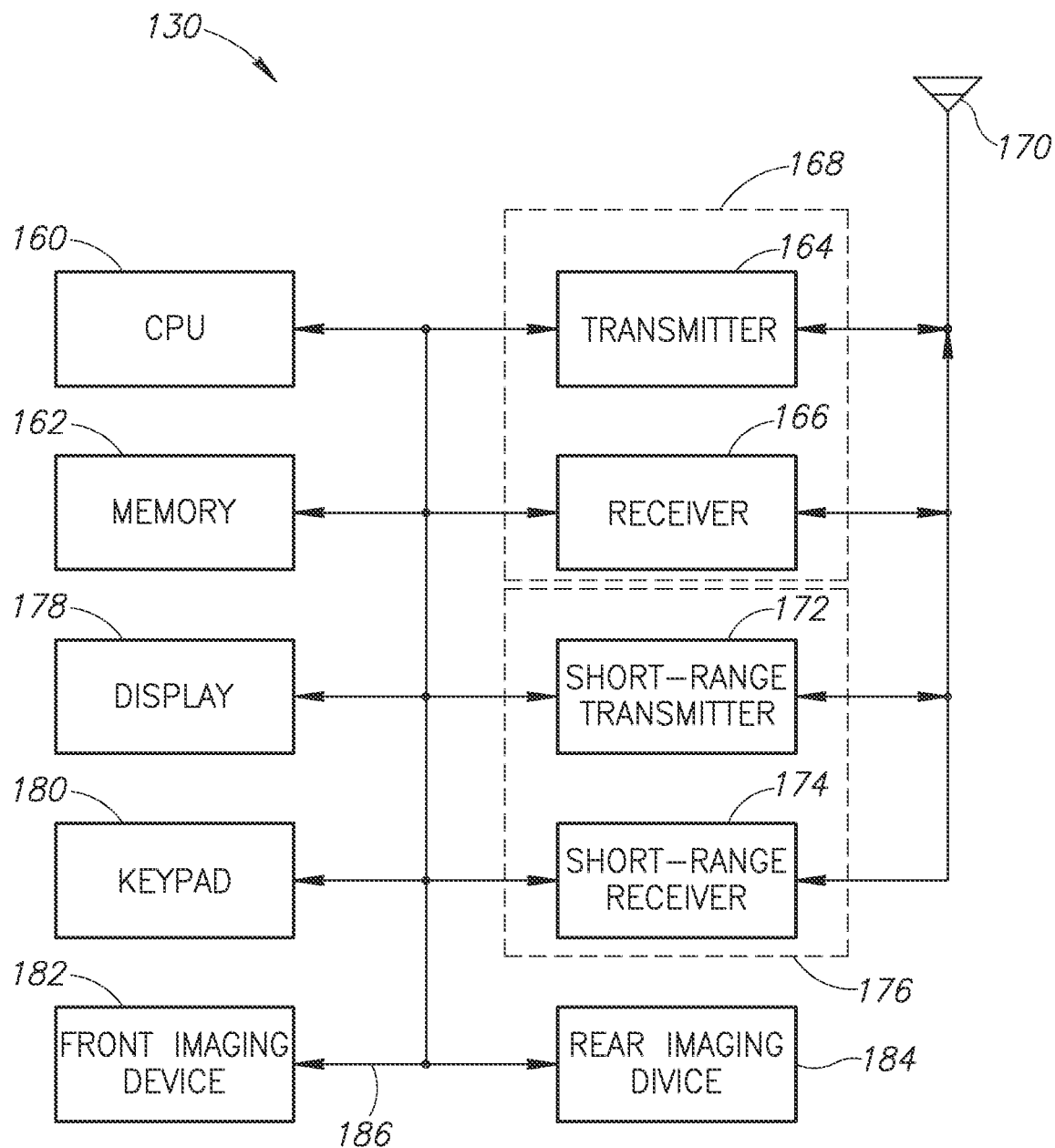
FIG. 3 is a functional block diagram of a mobile communication device operating in accordance with the present disclosure.

FIG. 3 is a functional block diagram of the mobile communication device 130. The mobile communication device 130 includes a CPU 160 and memory 162. In general, the memory 162 contains data and instructions that are executed by the CPU 160. The CPU 160 may be implemented as a conventional microprocessor, microcontroller, digital signal processor, application specific integrated circuit, or the like. The mobile communication device 130 is not limited by the specific implementation of the CPU 160. Similarly, the memory 162 may be implemented with a variety of known technologies. The memory 162 may include random access memory, read-only memory, programmable memory, and the like. In one embodiment, a portion of the memory 162 may be integrated into the CPU 160. The mobile communication device 130 is not limited by the specific form of the memory 152.

FIG. 3 also illustrates a network transmitter 164 and a receiver 166. In many implementations, the transmitter 164 and receiver 166 share common circuitry and are implemented as a transceiver 168. The transceiver 168 is coupled to an antenna 170. The transceiver 168 is illustrated in FIG. 3 as a generic device. Those skilled in the art will appreciate that the specific implementation of the transceiver 168 may depend on the particular PLMN 120 with which the mobile communication device 130 communicates. For example, the transceiver 168 in one mobile communication device 130 may be configured for operation in accordance with GSM standards while the transceiver 168 in a different mobile communication device may be configured for operation in accordance with CDMA or other communication protocols. However, as noted above, the system 100 may be readily implemented on mobile networks using various communication protocols and is not limited to any particular communication protocol.

In addition to the network transceiver 168, the mobile communication device 130 may include a short-range transmitter 172 and receiver 174. In many implementations, the transmitter 172 and receiver 174 share common circuitry and are implemented as a short-range transceiver 176. In an exemplary embodiment, the short-range transceiver 176 may be implemented as a WiFi transceiver in accordance with IEEE 802.11 or other similar standard. The short-range transceiver may be used by the mobile communication device to communicate with the AP 134 (see FIG. 1) in the manner described above.

In addition, the mobile communication device 130 includes a display 178 and keypad 180. The display 176 may be a black and white or color display and, in some embodiments, may be a touch-sensitive display. In this embodiment, the functionality of the keypad 180 may be combined with the display 178. These input/output devices operate in a conventional manner and need no further explanation regarding operational details.

FIG. 3 also illustrates a front or forward-facing imaging device 182 and a rear or rearward-facing imaging device 184. The imaging devices 182-184 may include a charge-coupled device and a lens (not shown), as is common in many wireless devices. Technical details of the imaging devices 182-184 to capture an image are well known in the art, and need not be described in greater detail herein.

The various components in FIG. 3 are coupled together by a bus system 186. The bus system 186 may include an address bus, data bus, control bus, power bus, and the like. For the sake of clarity, those various buses are illustrated in FIG. 3 as the bus system 186.

Figure 4:
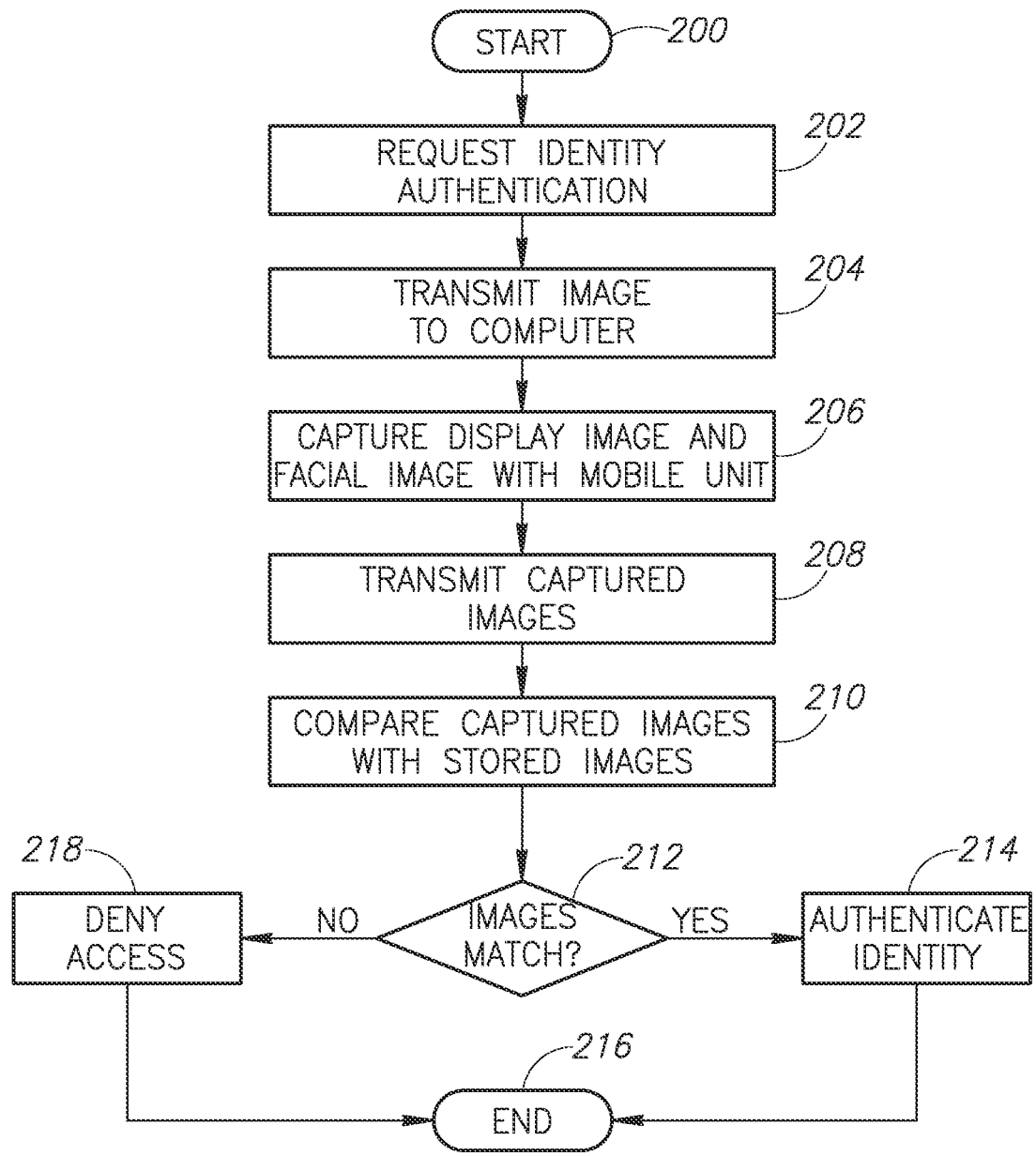
FIG. 4 is a flow chart illustrating the operation of the embodiment of FIG. 1.

FIG. 4 is a flow chart illustrating the operation of an exemplary embodiment of the system 100. At a start 200, the system illustrated in FIG. 1 is operational. At step 202 an identity authentication request is generated. The request is typically generated by the web server 116 (see FIG. 1) that the computer 102 wishes to access. In response to the access request from the computer 102, the web server 116 sends an authentication request to the authentication server 110.

The identity authentication request will include a request for an image. In an exemplary embodiment, the user provides log-in information that allows the web server 116 or the authentication server 110 to associate that user with the mobile communication device 130. In one embodiment, the user password may be the mobile telephone number or other data, such as the international mobile subscriber identity (IMSI), used in GSM communication systems, or equivalent identification, such as an electronic serial number (ESN) commonly used in CDMA communication systems. Thus, at the initial log-in attempt, the web server 116 has information identifying both the computer 102 and the mobile communication device 130. Alternatively, the user may provide a more conventional user name that does not include any data associated with the mobile communication device. In this embodiment, either the web server 116 or the authentication server 110 must contain data linking the user name with the mobile communication device 130. If the web server 116 contains this association data, the web server 116 transmits the association for the mobile communication device 130 to the authentication server 110 when requesting an image.

In step 204, the image is transmitted from the authentication server 110 (see FIG. 1) to the computer 102 via the network 106. Although the image could be transmitted from the authentication server 110 directly to the computer 102, a more common practice is for the web server 116 to provide a link to the image location in the image storage area 148. As those skilled in the art will appreciate, a web page often contains links to other sources of images and/or text. When the computer 102 wishes to access the web server 116, it typically navigates to a log-in page on the web server. As described above, the computer 102 provides the user name that may include data identifying the mobile communication device 130 or password data that may be used by the web server 116 or the authentication server 110 to identify the mobile communication device 130. When the user name is received by the web server 116, it generates a request to the authentication server 110 for an image. In an exemplary embodiment, the web server 116 also creates a space for the image and creates a filename for the image. The information passed from the web server 116 to the authentication server 110 includes the file name data. The authentication server 110 creates the image and stores it in the image storage area 148 (see FIG. 2) using the filename provided by the web server 116. When the image is created, the link in the log-in page of the web server 116 displays the image. The computer 102, in turn, renders the image on the display 104. The process of providing links to images in a web page and rendering images is well known and need not be described in greater derail herein.

In step 202, the system provides an image in response to a request for identity authentication. In one embodiment, the request for identity authentication may occur upon a user request for access to a computer, such as the web server 116 using the computer 102. In this embodiment, the image may be transmitted to the computer 102, as described above in step 204, in response to the request for identity authentication. However, in an alternative embodiment, the image can be "pushed" prior to any request for identity authentication. For example, a user may access the web server 116 using a conventional browser and entering the appropriate URL. When the browser goes to the selected URL, the image may simply be provided to the display 104 as part of the conventional log-in process. Thus, the image can simply be presented as part of a web page to which the user navigates. In this embodiment, the user can enter log-in data in addition to capturing the display image and user image as described above. The log-in data may be used in combination with the captured images to provide the necessary user authentication.

In one embodiment, a different image is presented every time a user browses to the URL. In addition, different users will each be provided with a different image for use in their identity authentication process. Thus, a plurality of users will each receive a unique image when navigating to the designated URL.

In one embodiment, the system 100 provides a new image every time a user browses to the URL to thus provide a new image for every user or to the same user on different occasions. In this embodiment, a new image is provided any time any user accesses the web page designated by the URL. Thus, access of the web page designated by the URL will cause the automatic replacement of the image for the next user. Alternatively, the image can be replaced upon completion of a transaction with the user. The term "transaction" is used to indicate a process conducted by the user using the computer 102. The transaction may be a logon process and completion of the transaction is the completion of the authentication associated with the logon process. In another example, the computer 102 may be an ATM or a POS terminal and the transaction may refer to a financial transaction (e.g., a banking transaction or a merchandise purchase) and completion of the transaction refers to the completion of the process at the ATM or POS terminal. When the transaction requiring the image has been concluded, the system 100 can use a new image for a subsequent transaction with the same user or a different user.

In an alternative embodiment, the system can be configured to replace the image periodically even when no users have accessed the web page designated by the URL. In this embodiment, the image is replaced upon expiration of a time-out period. Thus, a variety of different techniques may be used to provide the images displayed on the display 104.

In step 206, a user captures the image on the display 104 using the front imaging device 182 (see FIG. 3) of the mobile communication device 130 or the rear imaging device 184. At the same time, the other imaging device (i.e., either the front imaging device 182 or the rear imaging device 184) captures a facial image of the user. Application software within the mobile communication device 130 may provide guidance or instructions to the user to assist in the capture of optimal quality images. The application software generates the captured images and a time stamp indicating the time at which the images were captured by the mobile communication device 130. In an exemplary embodiment, the captured display image is also associated with the IMSI or other subscriber identifier for the mobile communication device 130. In step 208, the captured images, identifier, and time stamp are transmitted from the mobile communication device 130 to the authentication server 110 using the base station 126, PLMN 120, and the network 106. Alternatively, the captured images may be forwarded to the authentication server 110 via the AP 134 and the network 106.

In step 210, the image processor 146 (see FIG. 2) of the authentication server 110 compares the captured images transmitted from the mobile communication device 130 (see FIG. 1) with the stored image counterparts in the image storage area 148 (see FIG. 2). The image processor 146 can use known image analysis techniques to compare the captured images with the stored images.

If the captured images match the stored images, the images match and the result of decision 212 is YES. In that event, the authentication server 110 (see FIG. 1) authenticates the identity of the user of the mobile communication device 130 in step 214. An authentication message may be transmitted from the authentication server 110 to the web server 116 to indicate a match and the process ends at 216. If the images do not match, the result of decision 212 is NO and, in step 218, the authentication server 110 denies access. An access denied message (i.e., a "no match" message) may be sent from the authentication server 110 to the web server 116 and the process ends at 216. The process ends at 216 with the mobile communication device 130 being authenticated and allowing the computer 102 to access the web server 116 or with access to the web serving being denied if the images do not match.

In some cases, the authentication server 110 may send a message to the computer 102 if the file is corrupt, or the like, and prompt the user to retake a photograph of the image displayed on the display 104 of the computer 102.

The time stamp discussed above may also play a role in the authentication process. A time stamp is attached to the display image when it is stored in the image storage area 148 and transmitted to the computer 102. In one exemplary embodiment, the time stamp can be used to assure that the image transmitted by the authentication server 110 is quickly shown on the display 104. The mobile communication device 130 generates a time stamp when it captures and transmits the image on the display 104 of the computer 102. In this embodiment, the time stamp of the captured image must be within a short time (e.g., 30 seconds) of the time stamp generated by the authentication server 110 when the image was created and transmitted from the authentication server. Alternatively, the authentication server may continue to recognize the computer 102 for some predetermined period of time so that a user may navigate from one web server 116 to another web server without having to log in each time. In this example embodiment, the captured image may be valid for authentication purposes for a longer period of time (e.g., 30 minutes). In these embodiments, the authentication server 110 compares the captured image with the stored image in step 210 of FIG. 4 and also compares the time stamp on the captured display image or the captured facial image with the time stamp on the stored image to make sure they are within the selected time constraints.

Figure 5:
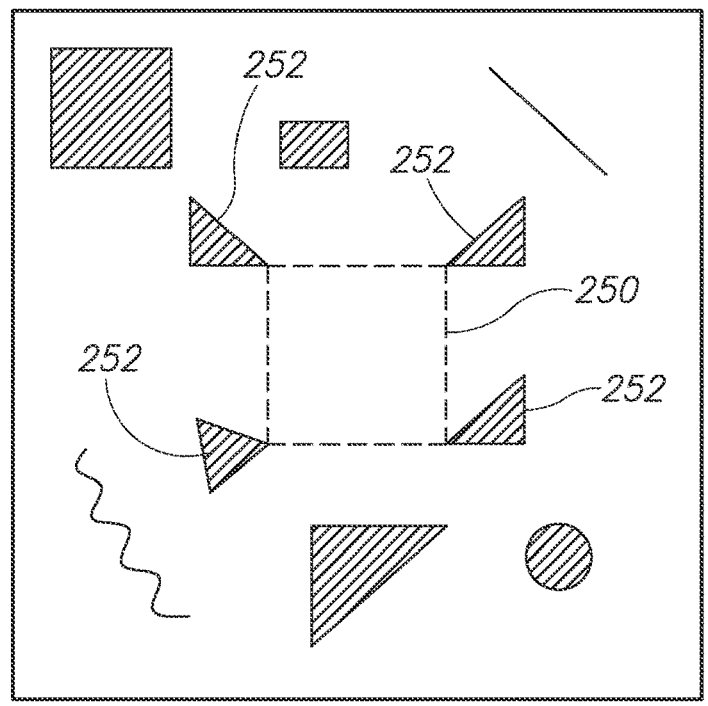
FIG. 5 illustrates a screen display containing a shared secret.

Those skilled in the art will appreciate that a wide variety of alternative implementations are possible with the system 100. For example, the images on the display 104 may be generated with a shared secret known only to the authenticated user and the authentication server 110. Examples of such image analysis using the shared secret are disclosed in U.S. application Ser. No. 13/457,015, entitled "System and Method for Computer Authentication Using Image Analysis of a Shared Secret," filed on Apr. 26, 2012, which is incorporated herein by reference in its entirety. An example of such image analysis using a shared secret is illustrated in FIG. 5. In the example of FIG. 5, the image on the display 104 (see FIG. 1) can be readily analyzed by the mobile communication device to authenticate the server 110. In the example of FIG. 5, there is a geometric relationship between seemingly random objects in the image. In FIG. 5, there is a seemingly random collection of geometric shapes, such as squares, triangles, rectangles, circles, lines, and the like. However, the shared secret in the example of FIG. 5 is that a square 250 may be formed by connecting the vertices of four triangles 252. The precise location of the triangles 252 within the image on the display 104 is not critical. Rather, it is the spatial relationship between the triangles 252 that permits the square 250 to be formed by connecting lines between the vertices of the triangles. Without knowledge of this shared secret, the server 110 cannot generate an image having the appropriate geometric relationship. Furthermore, the mobile device 130 cannot analyze the image in FIG. 5 without knowledge of the shared secret. Thus, each of the components (e.g., server 110 and the mobile communication device 130) must have knowledge of the shared secret. If either of these elements is not the authentic component, it will not contain knowledge of the shared secret and cannot provide the proper authentication. With this technique, the user has greater assurance that the server 110 is the actual server and not a connection with an unauthenticated server using phishing techniques to misdirect the user.

Figure 6:
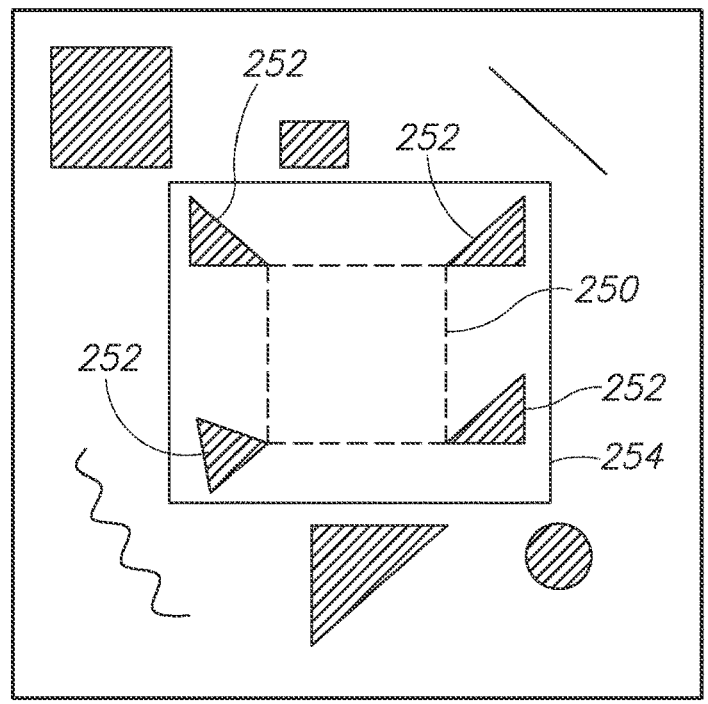
FIG. 6 illustrates the image of FIG. 5 in which the image is modified by the user in accordance with a shared modification secret.

In yet another embodiment, the user must modify the displayed image in a manner known only to the user and the authenticated server. This technique is described in U.S. application Ser. No. 13/835,134, entitled "System and Method for Computer Authentication With User Modification of an Image Using a Shared Secret," filed on Mar. 15, 2013 and incorporated herein by reference in its entirety. In one example described in the above-referenced application, the image of FIG. 5, contained in the shared secret, is captured using the front imaging device 182 (see FIG. 3) or the rear imaging device 184 in the manner described above. However, rather than sending back the unaltered image to the authentication server 110 (see FIG. 1), the user must modify the image in accordance with a shared modification secret. This is illustrated in FIG. 6 where the shared modification secret is that the user will draw a rectangle 254 around four triangles (e.g., the triangles 252) in the captured image. The rectangle 254 can simply be a line around the triangles 252, and the area within the rectangle may be transparent or opaque. In this embodiment, the mobile communication device 130 transmits the modified image to the authentication server 110 using the PLMN 120 or the AP 134, shown in FIG. 1. Thus, a variety of techniques are available to authenticate the user as well as the computer (e.g., the web server 116) that the user wishes to access.

The facial image processing also is subject to a variety of different implementations that fall within the spirit of the disclosed system 100. As noted above, the mobile communication device 130 has the front imaging device 182 and the rear imaging device 184. As those skilled in the art will appreciate, either the front imaging device 182 or the rear imaging device 184 may be used to capture an image on the display 104 while the other imaging device simultaneously captures the image of the person holding the mobile communication device. The captured display image is processed in a manner described above. The facial image may be processed in a variety of different manners. In one embodiment, it is possible to extract sufficient facial features to make a comparison with a stored image of the authorized user. The stored image may be stored on a remote server, such as the authentication server 110, the web server 116, or a different server (not shown). During the authentication process, the stored image of the authorized user is provided to the authentication server 110.

Alternatively, the stored image of the authorized user may be stored in the mobile communication device 130 itself. In this embodiment, the captured facial image, or extracted features thereof, are compared with a stored image of the authorized user. If a match is determined within the mobile communication device 130, a facial match indicator is generated and transmitted to the authentication server 110 along with the captured display image. If the authentication server determines a match between the captured display image and the stored display image, the authentication server can generate a display match indicator. The user is authenticated only if a display match indicator and a facial match indicator are both generated.

In another embodiment, the display 104 may be part of an ATM. In one embodiment, the ATM can request an image in response to user activation of a button (not shown). Activation of the button essentially initiates the request identity authentication step 202 in the flow chart of FIG. 4. In an alternative embodiment, the ATM may show a display immediately upon completion of a prior transaction. In this embodiment, the display 104 already has a displayed image at the time when the user may arrive at the ATM. The request identity authentication process in step 202 (see FIG. 4) may be activated by the capture of the displayed image and facial image of the user and the transmission of those images to the authentication server. In this embodiment, the step of transmitting the image to the computer (i.e., step 204 in FIG. 4) actually occurs prior to the request for identity authentication. As described above, the facial image may be analyzed within the mobile communication device 130 and the results transmitted to the authentication server or the captured facial image itself may be transmitted to the authentication server along with the captured display image. In that embodiment, both images are analyzed remote from the mobile communication device. The captured display image and the captured facial image may both be analyzed by the authentication server or may be analyzed separately by other authentication components in the system 100. For example, the captured facial image may be analyzed by the web server 116 while the captured display image is analyzed by the authentication server 110. No matter where the image analysis occurs, the user and computer 102 will not be authenticated unless the display match indicator and facial match indicator are both generated.

In another embodiment, other biometric capabilities may be used as part of the authentication process. For example, biometric data, such as a fingerprint, heartbeat, pulse, electrocardiogram, electroencephalogram, or the like may be used and compared to stored biometric data associated with an authenticated user. In this embodiment, the system 100 may use one or more captured biometric parameters. For example, a fingerprint may be captured using the mobile communication device and forwarded to the authentication server 110 (or other remote analysis device) for comparison with a fingerprint known to be from the authenticated user.

In yet another embodiment, metadata captured along with the display image and facial image may be provided to the authentication server to enhance reliability of the authentication process. For example, the mobile communication device 130 can include metadata such as the time of image capture, date of image capture, geolocation of image capture, identification of the computing device (e.g., the computer 102), the location of the computing device and verified user activities on the computing device. For example, if the computing device (e.g., the computer 102) is an ATM, the geolocation data provided by the mobile communication device must correspond to the known location of the ATM. If the geolocation data indicates a location of the mobile communication device 130 at some distance from the known location of the ATM, the authentication server 110 may deny access even in a situation where the captured display image and captured facial image generate the required match indicators.

The verified user activities on the computing device may include, by way of example, identification of files accessed by the user on the computing device, whether any data was transferred from, by way of example, the web server 116 to the computer 102, or the like. Such logged data may be useful in identifying unauthorized access to certain files.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system to verify user identity on a computing device having a display and coupled to a computer network, comprising:
   a server coupled to the computer network;
   a data storage area communicatively coupled to the server and configured to store an image;
   a network interface controller associated with the server and configured to control communications with the computer network wherein the server is configured to receive a request for user identity verification from the computing device and, in response to the request, to transmit the stored image to the computing device from which the request for user identity verification was received, using the computer network, to thereby display the image on the display;
   a mobile communication device having forward-facing and rearward-facing imaging devices and configured to capture the displayed image with one of the imaging devices and to simultaneously capture a user facial image with the other of the imaging devices to thereby generate a captured display image and a captured facial image;
   a mobile communication device transmitter configured to transmit the captured display image and the captured facial image;
   a display image analyzer, remote from the mobile communication device, configured to receive the captured display image transmitted from the mobile communication device and to perform an image analysis of the captured display image with respect to the stored image and generate a display match indicator if the image analysis indicates that the captured display image matches the stored image; and
   a facial image analyzer, remote from the mobile communication device, configured to receive the captured facial image transmitted from the mobile communication device and to analyze the captured facial image with respect to stored facial characteristics associated with a verified user and to generate a facial match indicator if the analysis indicates that the captured facial image contains facial characteristics that match the stored facial characteristics;
   wherein user identity is verified only if the display image analyzer generates the display match indicator and the facial image analyzer generates the facial match indicator.

2. The system of claim 1, further comprising a user interface on the mobile communication device to permit the user to modify the captured display image, by adding a display element to the captured display image in accordance with a shared secret, prior to transmission by the mobile communication device transmitter wherein the display image analyzer is further configured to receive the modified display image transmitted from the mobile communication device and to analyze the modified display image with respect to the stored image and generate a display match indicator if the analysis indicates that the modified display image matches the stored image modified in accordance with the shared secret.

3. The system of claim 1, further comprising a user interface on the mobile communication device to permit the user to modify the captured facial image, by adding a display element to the captured display image in accordance with a shared secret, prior to transmission by the mobile communication device transmitter wherein the facial image analyzer is further configured to receive the modified facial image transmitted from the mobile communication device and to analyze the modified facial image with respect to the stored facial characteristics and generate a display match indicator if the analysis indicates that the modified facial image matches the stored facial characteristics modified in accordance with the shared secret.

4. The system of claim 1 wherein the display image analyzer is associated with the server.

5. The system of claim 4 wherein the facial image analyzer is associated with the server.

6. The system of claim 1, further comprising an authentication server coupled to the computer network wherein display image analyzer is associated with the authentication server.

7. The system of claim 6 wherein the facial image analyzer is associated with the authentication server.

8. The system of claim 6 wherein the server and the authentication server are implemented as portions of the same server device.

9. The system of claim 1 wherein the display image analyzer and the facial image analyzer are portions of a common image analyzer at the location remote from the mobile communication device, wherein the captured display image and the captured facial image are transmitted to the common image analyzer by the mobile communication device transmitter.

10. The system of claim 1 wherein the server is further configured to store data associated with the captured display image and the captured facial image.

11. The system of claim 10 wherein the stored data associated with the captured display image and the captured facial image comprises at least one form of data from a data group comprising time of image capture, date of image capture, geolocation of image capture, identification of the computing device, location of the computing device, and verified user activities on the computing device.

12. The system of claim 1, further comprising:
   a biometric input system associated with the mobile communication device and configured to capture biometric data associated with the user; and
   the mobile communication device transmitter is further configured to transmit the captured biometric data to a biometric analyzer for comparison with stored biometric data associated with a verified user.

13. The system of claim 12 wherein the biometric data comprises at least one form of biometric data from a group of biometric data comprising a fingerprint, a heartbeat, a pulse, an electrocardiogram, and an electroencephalogram.

14. The system of claim 1 wherein the server is configured to transmit the stored image to the computing device in response to a request for identity authentication from the computing device.

15. The system of claim 1 wherein the data storage area is configured to store a plurality of images and the server is further configured to select one of the plurality of stored images and to transmit the selected image to the computing device in response to a conclusion of a transaction between the user and the computing device.

16. The system of claim 1 wherein the server is further configured to have an associated web page and the stored image is transmitted to the computing device as part of the web page in response to the computing device navigating to the web page.

17. The system of claim 16 wherein the data storage area is configured to store a plurality of images and the server is further configured to select one of the plurality of stored images as part of the web page.

18. The system of claim 17 wherein the server is further configured to select a different one of the plurality of stored images as part of the web page each time the computing device navigates to the web page.

19. The system of claim 17 for use with a plurality of computing devices wherein the server is further configured to select a different one of the plurality of stored images as part of the web page each time any of the plurality of computing devices navigates to the web page.

20. The system of claim 1 wherein the computing device is an automated teller machine (ATM).

21. The system of claim 20 wherein the server is further configured to select the image from a plurality of images stored in the data storage area.

22. The system of claim 20 wherein the server is further configured to generate the image.

23. The system of claim 20 wherein the ATM is used by a plurality of users and the display displays a different image for each of the plurality of users and, upon completion of a transaction for one of the plurality of users, the server transmits a different image for use to verify identity of a subsequent one of the plurality of users.

24. The system of claim 1 wherein the mobile communication device transmitter is configured to communicate with a public mobile land network (PLMN) wherein the captured display image is transmitted to the display image analyzer using the PLMN.

25. The system of claim 1 wherein the mobile communication device transmitter is configured to communicate with a network using a wireless access point wherein the captured display image is transmitted to the display image analyzer using the wireless access point.

26. A system to verify user identity using a wireless communication device having forward-facing and rearward-facing imaging devices, comprising:
a web server coupled to a computer network;
an authentication server communicatively coupled to the web server;
a data storage area communicatively coupled to the authentication server and configured to store an image and facial characteristics of a verified user;
a computing device coupled to the computer network and configured to communicate with the web server via the computer network wherein the computing device is configured to request access to the web server; and
a computer display operatively coupled to the computing device to display images;
the web server being configured to request an image from the authentication server upon receipt of an access request from the computing device and the authentication server is configured to provide the stored image for display on the computer display of the computing device from which the request for access to the web server was received, in response to the request for an image, to thereby permit the wireless communication device to capture the displayed image using one of the imaging devices and to capture a facial image of the user using the other of the imaging devices,
the authentication server being configured to receive the captured display image and the captured facial image and to compare the captured display image with the stored image to determine if there is a match therebetween and to compare the captured facial image with the stored facial characteristics to determine if there is a match therebetween, the authentication server sending a message to the web server to indicate whether or not there is a match between the captured display image and the stored image and between the captured facial image and the stored facial characteristics.

27. The system of claim 26 wherein the web server is configured to permit access to the web server by the computing device in response to receiving an indication from the authentication server indicating there is a match between the captured display image and the stored image and a match between the captured facial image and the stored facial characteristics or to deny access to the web server by the computing device in response to receiving an indication from the authentication server indicating there is a no match between the captured display image and the stored image or there is a no match between the captured facial image and the stored facial characteristics.

28. The system of claim 26 wherein the authentication server is coupled to the computer network and is configured to communicate with the web server using the computer network.

29. The system of claim 26 wherein the authentication server is implemented as a portion of the web server.

30. A method for the verification of user identity using a wireless communication device having forward-facing and rearward-facing imaging devices, comprising:
receiving a request for user identity verification from a computing device;
providing an image for display on a display of the computing device from which the request for user identity verification was received;
receiving a captured image of the displayed image captured by one of the imaging devices on the wireless communication device and an image of the user captured by the other of the imaging devices on the wireless communication device;
performing an image analysis on the image provided for display with respect to the captured display image to determine if they match;
comparing the captured user image with a stored user image to determine if they match; and verifying the identity of the user only if the captured display image matches the image provided for display and the captured user image matches the stored user image.

31. The method of claim 30 wherein comparing the image provided for display with the captured display image and comparing the captured user image with the stored user image are performed at a location remote from the computing device and the wireless communication device, the method further comprising:
receiving the captured display image from the wireless communication device at the remote location; and
receiving the captured user image from the wireless communication device at the remote location.

32. The method of claim 30 wherein the captured display image and the captured user image are received from the wireless communication device via a public mobile land network (PLMN).

33. The method of claim 30 wherein the captured display image and the captured user image are received from the wireless communication device via a wireless access point.

34. The method of claim 30, further comprising:
generating a display image match indicator if comparing the image provided for display with the captured display image received from the wireless communication device is determined to be a match; and
generating a user image match indicator if comparing the captured user image received from the wireless communication device with the stored user image is determined to be a match;
wherein authenticating the user comprises authenticating the user only if the display image match indicator and the user image match indicator are both generated.

35. The method of claim 34 wherein comparing the captured user image with the stored user image and generating the user image match indicator if comparing the captured user image received from the wireless communication device with the stored user image is determined to be a match are performed in the wireless communication device.

36. The method of claim 30 wherein the captured display image is modified in the wireless communication device and comparing the image provided for display with the captured display image comprises comparing the image provided for display with the modified display image received from the wireless communication device to determine if they match and that the captured image has been modified in accordance with a shared secret known by an authenticated user.

37. The method of claim 30 wherein providing the image for display on the computing device is in response to a request for identity authentication from the computing device.

38. The method of claim 30, further comprising selecting an image from a plurality of images and providing the selected image for display on the computing device in response to a conclusion of a transaction between the user and the computing device.

39. The method of claim 30 wherein the image provided for display is further associated with web page and providing the image for display on the computing device is in response to the computing device navigating to the web page.

40. The method of claim 39, further comprising selecting an image from a plurality of images and using the selected image as part of the web page.

41. The method of claim 40 wherein selecting an image from the plurality of images comprises selecting a different one of the plurality of images as part of the web page each time the computing device navigates to the web page.

42. The method of claim 40 for use with a plurality of computing devices wherein selecting an image from the plurality of images comprises selecting a different one of the plurality of images as part of the web page each time any of the plurality of computing devices navigates to the web page.

43. The method of claim 30, further comprising selecting an image from a plurality of images and wherein providing the image for display on the computing device uses the selected image.

44. The method of claim 43, further comprising measuring a time period wherein selecting an image from a plurality of images is performed upon expiration of the time period.

45. The method of claim 30 wherein the computing device is an automated teller machine (ATM) and the computing device display is associated therewith.

46. The method of claim 45 wherein providing an image for display comprises selecting the image from a plurality of stored images and providing the selected image for display on the ATM display.

47. The method of claim 45, further comprising generating the image wherein providing an image for display comprises providing the generated image for display on the ATM display.

48. The method of claim 45 wherein the ATM is used by a plurality of users and providing an image for display comprises providing a different image for each of the plurality of users and, upon completion of a transaction for one of the plurality of users, providing a different image for use to verify identity of a subsequent one of the plurality of users.

49. A system to verify user identity on a computing device having a display and coupled to a computer network, comprising:
a server coupled to the computer network;
a data storage area communicatively coupled to the server and configured to store an image;
a network interface controller associated with the server and configured to control communications with the computer network wherein the server is configured to receive a request for user identity verification from the computing device and, in response to the request, to transmit the stored image to the computing device from which the request for user identity verification was received, using the computer network, to thereby display the image on the display;
a mobile communication device having forward-facing and rearward-facing imaging devices and configured to capture the displayed image with one of the imaging devices and to simultaneously capture a user facial image with the other of the imaging devices to thereby generate a captured display image and a captured facial image;
a mobile communication device transmitter configured to transmit the captured display image and the captured facial image;
a user interface on the mobile communication device to permit the user to modify the captured display image, by adding a display element to the captured display image in accordance with a shared secret, prior to transmission by the mobile communication device transmitter;
a display image analyzer, remote from the mobile communication device, configured to receive the modified display image transmitted from the mobile communication device and to analyze the modified display image with respect to the stored image and generate a display match indicator if the analysis indicates that the modified display image matches the stored image modified in accordance with the shared secret; and a facial image analyzer, remote from the mobile communication device, configured to receive the captured facial image transmitted from the mobile communication device and to analyze the captured facial image with respect to stored facial characteristics associated with a verified user and to generate a facial match indicator if the analysis indicates that the captured facial image contains facial characteristics that match the stored facial characteristics;

wherein user identity is verified only if the display image analyzer generates the display match indicator and the facial image analyzer generates the facial match indicator.

50. A system to verify user identity on a computing device having a display and coupled to a computer network, comprising:

a server coupled to the computer network;

a data storage area communicatively coupled to the server and configured to store an image;

a network interface controller associated with the server and configured to control communications with the computer network wherein the server is configured to receive a request for user identity verification from the computing device and, in response to the request, to transmit the stored image to the computing device from which the request for user identity verification was received, using the computer network, to thereby display the image on the display;

a mobile communication device having forward-facing and rearward-facing imaging devices and configured to capture the displayed image with one of the imaging devices and to simultaneously capture a user facial image with the other of the imaging devices to thereby generate a captured display image and a captured facial image;

a mobile communication device transmitter configured to transmit the captured display image and the captured facial image;

a user interface on the mobile communication device to permit the user to modify the captured facial image, by adding a display element to the captured facial image in accordance with a shared secret, prior to transmission by the mobile communication device transmitter;

a display image analyzer, remote from the mobile communication device, configured to receive the captured modified display image transmitted from the mobile communication device and to analyze the captured display image with respect to the stored image and generate a display match indicator if the analysis indicates that the captured display image matches the stored image; and a facial image analyzer, remote from the mobile communication device, configured to receive the modified facial image transmitted from the mobile communication device and to analyze the modified facial image with respect to stored facial characteristics associated with a verified user and generate a facial match indicator if the analysis indicates that the modified facial image matches the stored facial characteristics modified in accordance with the shared secret wherein user identity is verified only if the display image analyzer generates the display match indicator and the facial image analyzer generates the facial match indicator.

* * * * *